Patented July 16, 1935

2,008,238

UNITED STATES PATENT OFFICE 2,008,238

LIQUID ANTHELMINTICS

Max Bockmühl, Robert Knoll, and Oskar Wagner, Frankfort-on-the-Main, Germany, assignors to Winthrop Chemical Company, Inc., New York, N. Y., a corporation of New York No Drawing. Application October 23, 1933, Serial No. 694,880. In Germany October 25, 1932

6 Claims. (Cl. 167—55)

It is known that the liquid anthelmintics usually employed in therapy, such as carbon tetrachloride and chenopodium oil, cannot well be taken because they have a disagreeable taste and irritate the mucous membranes. If it is not desired to administer the liquid anthelmintics in capsules of gelatine, they must be administered in a drink. This is, however, only a make-shift as the anthelmintics are insoluble in liquids for drinking so that the disagreeable properties cannot be removed or diminished by this method of administration. The use of the anthelmintics enclosed in capsules of gelatine involves the drawback that some of the anthelmintics, after the digestion of the capsules, have irritating effects on the stomach and intestinal tract. Their use in the form of alcoholic or other solutions entails the disadvantage that the active substances are precipitated when the solution comes into contact with water or aqueous liquids, such as saliva. No process is known for converting liquid anthelmintics into concentrated solutions which may be mixed with water or aqueous liquids without separation of the active substances.

According to this invention, solutions of anthelmintics suitable for administration are made by dissolving a liquid substance known to have an anthelmintic effect in a salt of a basic derivative of a higher fatty acid. These solutions are miscible with water without precipitation of the active substance. On the contrary, a moderate addition of water to such a solution produces a liquid of creamy consistency, and on addition of a large quantity of water finely dispersed emulsions are obtained. There may be used for this purpose all higher fatty acid compounds that have a basic group and are, therefore, when in the form of salts, soluble in water, as for instance the compounds described in U. S. Patents No. 1,805,355 dated May 12, 1931, to Max Bockmuehl and Robert Knoll and No. 1,894,375 dated January 17, 1933, to Robert Knoll and in U. S. Patent No. 1,958,529, dated May 15, 1934 by two of the present applicants. As higher fatty acids there may particularly be used the fatty acids containing at least ten carbon atoms, for instance oleic acid, palmitic acid, stearic acid and lauric acid. Salts of the basic fatty acid compounds with organic carboxylic acids, for instance, the acetates, propionates, butyrates, lactates and benzoates, which often have an oily consistency are particularly suitable. According to this invention solutions of any desired concentration may easily be prepared. The solutions may be administered in drinks or in capsules. They may be mixed with adjuvants, other desired medicines, substances which are capable of improving the taste, or the like. Liquid anthelmintics are, for instance, carbon tetrachloride, ethylene tetrachloride, ascaridol and chenopodium oil.

It could not be foreseen that it would be possible to obtain concentrated solutions from liquid anthelmintics and salts of basic compounds of higher fatty acids, because the liquid anthelmintics are practically insoluble in water, but soluble in fats, whereas the salts of the basic fatty acid compounds are soluble in water.

The following examples illustrate the invention; the parts are by weight:

(1) 100 parts of chenopodium oil are dissolved in 100 parts of the benzoate of 4-diethylaminoethoxyoleylanilde of the formula:

(2) 100 parts of carbon tetrachloride are dissolved in 100 parts of the benzoate of 4-diethylaminoethoxyoleylanilide.

(3) 100 parts of chenopodium oil are dissolved in 100 parts of the lactate of 4-diethylaminoethoxyoleylanilide.

In the same manner there may be used for the preparation of an anthelmintic carbon tetrachloride or ethylene tetrachloride or chenopodium oil together with the lactates, benzoates or acetates of the following compounds:

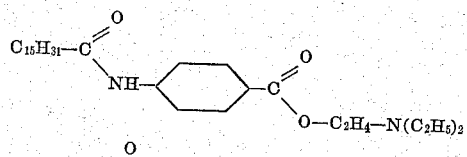

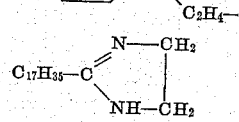

or of the condensation products of oleic acid or stearic acid with α-diethylamino-β-hydroxypropylamine or α-diethylamino-β-hydroxy-γ-phenylaminopropane.

We claim:

1. Liquid anthelmintics comprising a liquid substance known to have an anthelmintic effect and an organic carboxylic acid salt of a basic derivative of a fatty acid containing at least 10 carbon atoms.

2. Liquid anthelmintics comprising a liquid substance known to have an anthelmintic effect and an organic carboxylic acid salt of a compound of the following formula:

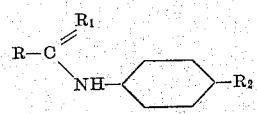

wherein R stands for an aliphatic hydrocarbon radical containing at least 10 carbon atoms, $R_1$ stands for O or NH and $R_2$ stands for an aliphatic radical with a tertiary amino group or for an amino group which contains at least an aliphatic radical with a tertiary nitrogen atom.

3. Liquid anthelmintics comprising a liquid substance known to have an anthelmintic effect and an organic carboxylic acid salt of a compound of the following formula:

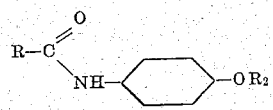

wherein R stands for an aliphatic hydrocarbon containing at least 10 carbon atoms and $R_2$ stands for an aliphatic radical with a tertiary nitrogen atom.

4. A liquid anthelmintic comprising chenopodium oil and the benzoate of 4-diethylamino-ethoxyoleylanilide.

5. A liquid anthelmintic comprising carbon tetrachloride and the benzoate of 4-diethylamino-ethoxyoleylanilide.

6. A liquid anthelmintic comprising chenopodium oil and the lactate of 4-diethylamino-ethoxyoleylanilide.

MAX BOCKMÜHL.
ROBERT KNOLL.
OSKAR WAGNER.